(12) United States Patent
Gueorguiev

(10) Patent No.: US 9,059,630 B2
(45) Date of Patent: Jun. 16, 2015

(54) HIGH VOLTAGE MULTIPLIER FOR A MICROPHONE AND METHOD OF MANUFACTURE

(75) Inventor: Svetoslav Radoslavov Gueorguiev, Copenhagen SV (DK)

(73) Assignee: KNOWLES ELECTRONICS, LLC, Itasca, IL (US)

( * ) Notice: Subject to any disclaimer, the term of this patent is extended or adjusted under 35 U.S.C. 154(b) by 243 days.

(21) Appl. No.: 13/596,229

(22) Filed: Aug. 28, 2012

(65) Prior Publication Data

US 2013/0051583 A1    Feb. 28, 2013

Related U.S. Application Data

(60) Provisional application No. 61/529,612, filed on Aug. 31, 2011.

(51) Int. Cl.
| | | |
|---|---|---|
| H04R 3/00 | (2006.01) | |
| H02M 3/07 | (2006.01) | |
| G05F 3/02 | (2006.01) | |
| H04R 19/04 | (2006.01) | |

(52) U.S. Cl.
CPC .............. *H02M 3/073* (2013.01); *H04R 19/04* (2013.01)

(58) Field of Classification Search
USPC .................................. 327/535–537; 381/111
See application file for complete search history.

(56) References Cited

U.S. PATENT DOCUMENTS

| 6,914,791 B1 | 7/2005 | Park et al. | |
|---|---|---|---|
| 2005/0133870 A1 | 6/2005 | Manna et al. | |
| 2007/0093028 A1* | 4/2007 | Wang ........................... | 438/275 |
| 2009/0253240 A1 | 10/2009 | Tam et al. | |
| 2010/0019343 A1 | 1/2010 | Ellis et al. | |
| 2013/0287231 A1* | 10/2013 | Kropfitsch ................... | 381/113 |

FOREIGN PATENT DOCUMENTS

KR    20050054192    6/2005

OTHER PUBLICATIONS

Umezawa et al., "A 5-V-Only Operation 0.6-um Flash EEPROM with Row Decoder Scheme in Triple-Well Structure", IEEE Journal of Solid-State Circuits, Nov. 1992, pp. 1540-1546, vol. 27 No. 11.

Yan et al., "A High Efficiency ALL-PMOS Charge Pump for Low-Voltage Operations", Asian Solid-State Circuits Conference 2005, Nov. 2005, pp. 361-364, vol. P1-11.

(Continued)

*Primary Examiner* — Ahmad Matar
*Assistant Examiner* — Norman Yu
(74) *Attorney, Agent, or Firm* — Fitch, Even, Tabin & Flannery LLP

(57) ABSTRACT

A microphone circuit includes a condenser microphone and a charge pump. The condenser microphone is configured to receive sound energy and responsively convert the sound energy into a microphone output voltage. The charge pump is implemented in a low voltage CMOS process. It is coupled to the microphone and is configured to supply a bias voltage to the microphone allowing the microphone to operate. By using a proper circuit topology, whose maximum output voltage is limited by the breakdown voltage between the NWELL and the substrate, and by blocking the formation of the PWELL around the NWELL at a predetermined distance so that the NWELL is surrounded by a very lightly doped substrate from all sides, the maximum output voltage of the charge pump is increased significantly.

8 Claims, 3 Drawing Sheets

(56) References Cited

OTHER PUBLICATIONS

Favrat et al., "A High-Efficiency CMOS Voltage Doubler", IEEE Journal of Solid-State Circuits, Mar. 1998, pp. 410-416, vol. 33 No. 3.

Shin et al., "A New Charge Pump Without Degradation in Threshold Voltage Due to Body Effect", IEEE Journal of Solid-State Circuits, Aug. 2000, pp. 1227-1230, vol. 35 No. 8.

Aparico et al., "Capacity Limits and Matching Properties of Integrated Capacitors", IEEE Journal of Solid-State Circuits, Mar. 2002, pp. 384-393, vol. 37 No. 3.

Wu et al., "MOS Charge Pumps for Low-Voltage Operation", IEEE Journal of Solid-State Circuits, Apr. 1998, pp. 592-597, vol. 33 No. 4.

Dickson, "On-Chip High-Voltage Generation in MNOS Integrated Circuits Using an Improved Voltage Multiplier Technique", IEEE Journal of Solid-State Circuits, Jun. 1976, pp. 374-378, vol. SC-11 No. 3.

Pelliconi et al., "Power Efficient Charge Pump in Deep Submicron Standard CMOS Technology", IEEE Journal of Solid-State Circuits, Jun. 2003, pp. 1068-1071, vol. 38 No. 6.

International Search Report and Written Opinion for related PCT Application No. PCT/US2012/052764, Feb. 18, 2013, 8 pages.

\* cited by examiner

HIGH VOLTAGE MULTIPLIER FOR A MICROPHONE AND METHOD OF MANUFACTURE

CROSS REFERENCE TO RELATED APPLICATION

This patent claims benefit under 35 U.S.C. §119 (e) to U.S. Provisional Application No. 61/529,612 entitled "High Voltage Multiplier For A Microphone And Method Of Manufacture" filed Aug. 31, 2011, the content of which is incorporated herein by reference in its entirety.

TECHNICAL FIELD

This application relates to microphones and voltage multipliers that are associated with these microphones.

BACKGROUND OF THE INVENTION

Various types of microphone systems have been used in various applications through the years. Microphones in these systems typically receive acoustic energy and convert this acoustic energy into an electrical voltage. This voltage can be further processed by other applications or for other purposes. For example, in a hearing aid system the microphone may receive acoustic energy, and convert the acoustic energy to an electrical voltage. The voltage may be amplified or otherwise processed by an amplifier, or by other signal processing electronics circuitry, and then presented by a receiver as acoustic energy to a user or wearer of the hearing aid. To take another specific example, microphone systems in cellular phones typically receive sound energy, convert this energy into a voltage, and then this voltage can be further processed for use by other applications. Microphones are used in other applications and in other devices as well.

One type of microphone that is known and used is a condenser microphone. The condenser microphone operates as a variable capacitor whose value is modulated by the pressure of an incoming sound wave. Viewed as a capacitor having two plates, one of the capacitor plates is static, while the other one is mobile (i.e., the diaphragm of the microphone). The sound wave changes the distance between the plates and thereby the capacitance C of the capacitor.

A microelectromechanical system (MEMS) microphone is a variant of the condenser microphone and is formed by using silicon micro-fabrication techniques. Compared to the conventional condenser microphone, it has several advantages such as a reduced size, a lower temperature coefficient, and a higher immunity to mechanical shocks. In addition, the MEMS microphone takes advantage of a lithography process which is very suitable for mass production of devices.

One of the most common methods to obtain useful electrical signals from such microphones is to maintain a constant charge Q on the capacitor C. The voltage across the capacitor will change inversely proportionally to the incoming sound wave pressure according to the equation $V=Q/C$, consequently $dV=-VdC/C$.

Unfortunately, the sensitivity (indicated by dV) depends upon the voltage V and it is difficult to obtain a high voltage V in a standard low voltage CMOS process. This has led to either microphones with inadequate sensitivities for many applications or microphones with high prices. As a result, there has been dissatisfaction with previous approaches.

BRIEF DESCRIPTION OF THE DRAWINGS

For a more complete understanding of the disclosure, reference should be made to the following detailed description and accompanying drawings wherein.

Figure 1:
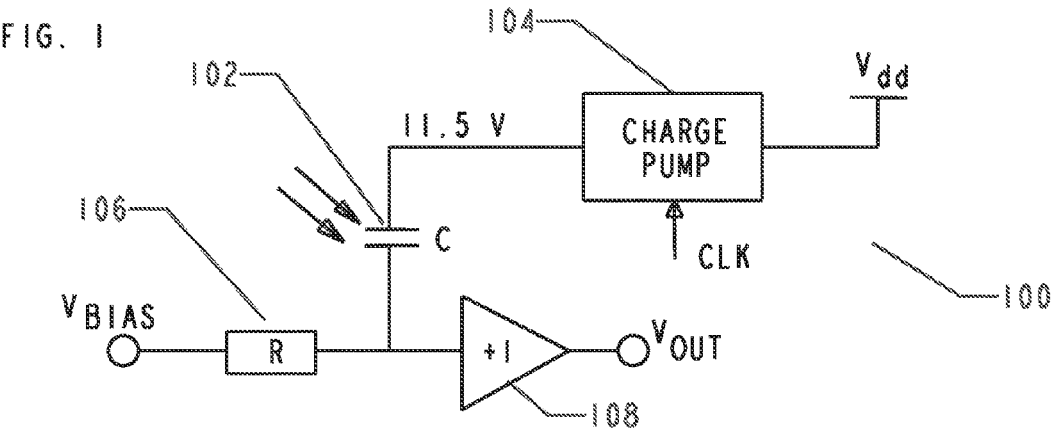
FIG. 1 comprises a block diagram of a microphone system according to various embodiments of the present invention.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Microphones and other acoustic devices with sufficiently high sensitivities for use in acoustic applications are provided. The approaches described herein not only provide devices with sufficiently high sensitivities, but these devices are also lower in cost (compared to previous approaches). Additionally, these devices have excellent electrical characteristics such as a low temperature coefficient and power efficiency. Approaches for manufacturing these microphones are also provided.

In some aspects, the maximum output voltage of a capacitive voltage multiplier (i.e., a charge pump) constructed according to standard CMOS device layouts is significantly increased. This is accomplished using a circuit that includes PMOS transistors constructed on a substrate having PWELL/NWELL regions and/or a circuit that includes NMOS and PMOS transistors constructed on a substrate having PWELL/NWELL/Deep NWELL regions. Substrate doping blocking is performed and realized around the NWELL regions (and/or the Deep NWELL regions) by selectively physically separating at least some of these regions from the adjacent PWELL regions by a distance L.

Using these approaches, the maximum output voltage of the charge pump is increased significantly. For example, the voltage can be increased from 10V to 20V. The output voltage limitations present in previous charge pump circuits implemented in a double well standard CMOS process (where the critical (limiting) breakdown voltage between NWELL and the substrate is limited by the breakdown voltage of the side-wall component of the NWELL to PWELL/substrate junction) are overcome. Similarly, output voltage limitations present in previous charge pump circuits implemented in a triple well standard CMOS process (where the critical (limiting) breakdown voltage between NWELL and the substrate and between the NWELL/Deep NWELL and the substrate is also limited by the breakdown voltage of the sidewall component of the NWELL to PWELL/substrate junction) are overcome. Thus, the need for an additional process and/or circuitry to create high voltages is eliminated.

In many of these embodiments a microphone circuit includes a condenser microphone and a charge pump. The condenser microphone is configured to receive sound energy and responsively convert the sound energy into a microphone output voltage. The charge pump is coupled to the microphone and is configured to supply a bias voltage to the microphone allowing the microphone to operate. The charge pump includes a substrate, a first PWELL region that is formed in the substrate, an NWELL region that is formed in the substrate, and a second PWELL region that is formed in the substrate. The first and the second PWELL regions are separated from the NWELL region by a predetermined distance that is effective to create a doping blocking around the NWELL region and that maximizes the output voltage of the charge pump.

In some aspects, the first PWELL region and the second PWELL region are lightly doped with acceptor atoms and the NWELL region is lightly doped with donor atoms. In other aspects, an amplifier is coupled to the condenser microphone. In still other aspects, a deep NWELL region is disposed in the substrate. In some examples, the deep NWELL region is disposed adjacent to the NWELL region. In yet other aspects, the substrate is very lightly doped and completely surrounds the NWELL region. (The PWELL region is with heavier doping than the substrate.)

In others of these embodiments, a microphone circuit includes a condenser microphone and a charge pump. The condenser microphone is configured to receive sound energy and responsively convert the sound energy into a microphone output voltage. The charge pump is implemented in a standard low voltage CMOS process. It is coupled to the microphone and is configured to supply a bias voltage to the microphone allowing the microphone to operate. The charge pump includes a circuit topology that includes an NWELL region and a substrate. By using a proper circuit topology, whose maximum output voltage is limited by the breakdown voltage between the NWELL region and the substrate, and by blocking the formation of a PWELL region around the NWELL region at a predetermined distance so that the NWELL region is surrounded by a very lightly doped substrate from all sides, the maximum output voltage of the charge pump is increased significantly.

Referring now to FIG. 1, one example of a microphone circuit 100 constructed according to the present approaches is described. The circuit 100 includes a microphone 102, a charge pump 104, a resistor 106, and a buffer 108. The microphone produces a change in voltage $dV=-VdC/C$ where V is the voltage at the output of the pump 104, and C is the capacitance of the microphone 102. The charge pump 104 provides a sufficiently high voltage V across the microphone according to the approach described herein.

The resistor 106 has a high value so that it forms a low pass RC filter for the bias voltage, while it has a high pass characteristic for the variable voltage across the microphone. The high DC voltage (e.g., 11.5 V) needed across the microphone is provided by the voltage pump 104. The output filter of the charge pump 104 is not shown in FIG. 1 for simplicity. Vbias is set to ground in order to have maximum DC voltage across the microphone. The buffer 108 in this example is a unity gain buffer. For proper operation, the unity gain buffer has a high input resistance and a very low input capacitance. The output may be connected to the next stage (e.g., an amplifier).

In order to reduce the size, the cost, and the power consumption of the microphone electronics, it may be integrated on to a single chip. A CMOS construction process can be chosen for the purpose because of its low cost and the availability of transistors with very high input impedance. Furthermore, this process is particularly advantageous for a system that is implemented as a mixed-signal (analog/digital) chip with a relatively large digital core.

The charge pump 104 is the only high voltage building block in the system 100 that requires the corresponding process described herein for its implementation. In order to lower the cost even further, it is advantageous to be able to implement the charge pump 104 in a standard low voltage CMOS process using only devices readily available in commercially available design kits.

Figure 2:
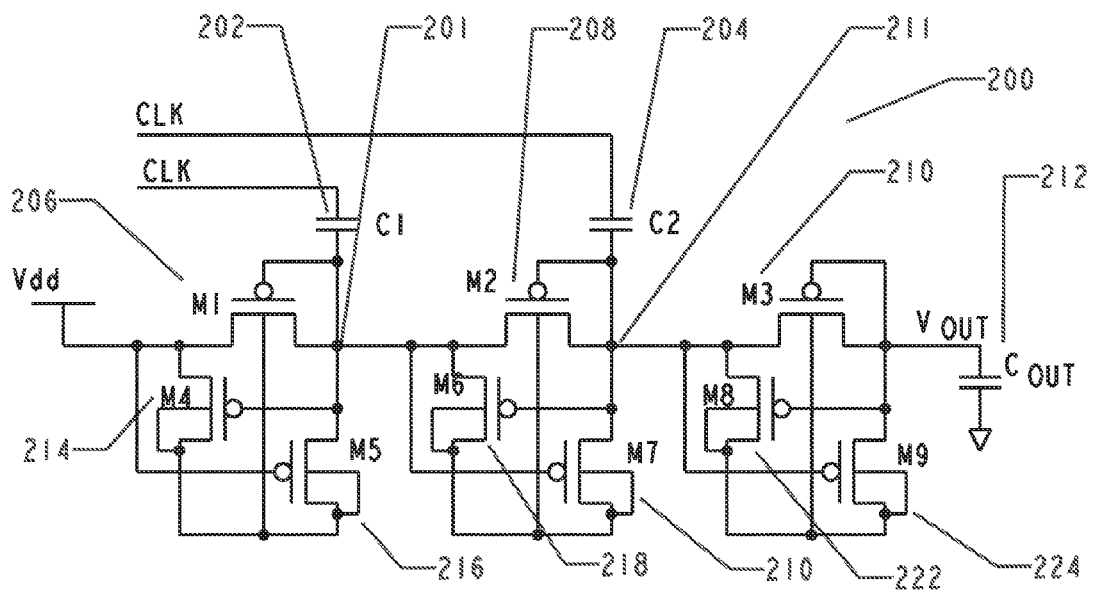
FIG. 2 comprises a circuit diagram of a voltage multiplier (or charge pump) according to various embodiments of the present invention.

Referring now to FIG. 2, one example of a voltage pump circuit 200 (e.g., the voltage pump 104 of FIG. 1) is described. The circuit of FIG. 2 is a two-stage Dickson-type charge pump that omits the degradation due to the body effect (i.e., it is a voltage tripler). By "body effect," it is meant a change in the threshold voltage of a MOS transistor as a result of a change in its source-bulk voltage. In one aspect, if the source is connected (shorted) to the bulk there is no "body effect". The circuit of FIG. 2 can be extended to an N stage charge pump where N is any integer.

The circuit 200 includes capacitors 202 (C1), 204 (C2) and 212 (COUT). The circuit 200 also includes transistors 206 (M1), 208 (M2), 210 (M3), 214 (M4), 216 (M5), 218 (M6), 220 (M7), 222 (M8) 224 (M9). The transistors M1-M9 are PMOS transistors.

Initially, the capacitors 202 (C1), 204 (C2), and 212 (Cout) are not charged. Therefore, the voltages across all of them are zero and $V_{Clk}=0$ V; $V_{\overline{Clk}}=Vdd$. It will be appreciated that the voltages used herein use subscripts that refer to various points or elements in the circuits (e.g., $V_{clk}$ is the clock voltage, $V_{dd}$ is the supply voltage, $V_{dsm1}$ refers to the drain to source voltage of transistor M1, and so forth).

Vdd is applied to the designated input node in FIG. 2. The diode connected transistor 206 (M1) is on and the capacitor 202 (C1) is being charged to a voltage $V_{C1}=Vdd-Vds_{M2}$, where $Vds_{M1}$ is the voltage drop across the transistor 206 (M1). Normally, Vdd » $Vds_{M1}$ so that $V_{C1} \sim Vdd$. The diode connected transistor 208 (M2) is off.

The clock signal changes its value $V_{Clk}=Vdd$; $V_{\overline{Clk}}=0$ V. The voltage of node 201 is $V_1=V_{C1}+V_{Clk}\sim 2Vdd$. The transistor 208 (M2) turns on. Transistor 206 (M1) turns off at the same time. The capacitor 204 (C2) is being charged to a voltage $V_{C2}=V_{C1}+V_{Clk}-Vds_{M2}$. Again, normally $V_{C1}+V_{Clk} \gg Vds_{M2}$, so that at steady state $V_{C2} \sim V_{C2}+V_{Clk} \sim 2Vdd$.

The clock signal changes its value $V_{Clk}=0$V; $V_{\overline{Clk}}=Vdd$. The process described above repeats. At the same time the voltage of node 211 is $V_2=V_{C2}+V_{\overline{Clk}}$. The diode connected transistor 210 (M3) turns on. The capacitor 212 (Cout) is being charged to a voltage $V_{Cout}=V_{C2}+V_{\overline{Clk}}-Vds_{M2}$. Again, normally $V_{C2}+V_{\overline{Clk}} \gg Vds_{M2}$, so that at steady state $V_{Cout} \sim V_{C2}+V_{\overline{Clk}} \sim 3Vdd$. The output voltage (Vout=$V_{Cout}$) is approximately 3 times the input one (Vdd). Thus, the circuit described is a voltage tripler. Without neglecting the voltage drops (Vds) across the diodes the output voltage is:

$$Vout=V_{Cout}=Vdd+2(Vdd-Vds)$$

The operation described above is cyclic. In the general case when there are N stages the output voltage of the charge pump is:

$$Vout=Vdd+N(Vdd-Vds)$$

The transistor pairs 214 and 216 ($M_4$-$M_5$), 218 and 220 ($M_6$-$M_7$) and 222 and 224 ($M_8$-$M_9$) function as comparators/switches. They ensure that the bulk of each charge transfer transistor—206 (M1), 208 (M2), and 210 (M3) correspondingly—is either switched to its source or drain, depending on which of them has a higher potential. This eliminates the bulk effect of transistors 206 (M1), 208 (M2), and 210 (M3). As a result, the Vds of each stage is minimized and does not depend on the stage number. Hence, the output voltage Vout is a linear function of the number of stages N. The above-described bulk switching also provides proper biasing for the p-n junctions of the transistors.

The bulk of the charge transfer PMOS transistor is either switched to its source or drain, depending on which of them has a higher potential. This is done with two auxiliary transistors (e.g., 214 ($M_4$) and 216 ($M_5$)) functioning as comparators/switches. The maximum voltage appears across the NWELL to substrate junction in these devices. In one standard 0.18 um CMOS construction process and as known to those skilled in the art, this voltage is about 10 volts. This voltage, however, is limited by the breakdown voltage of the sidewall component of the NWELL to PWELL/substrate junction. In a standard deep submicron CMOS process, the area that is not an NWELL region is automatically formed (doped) as PWELL.

Figure 3:
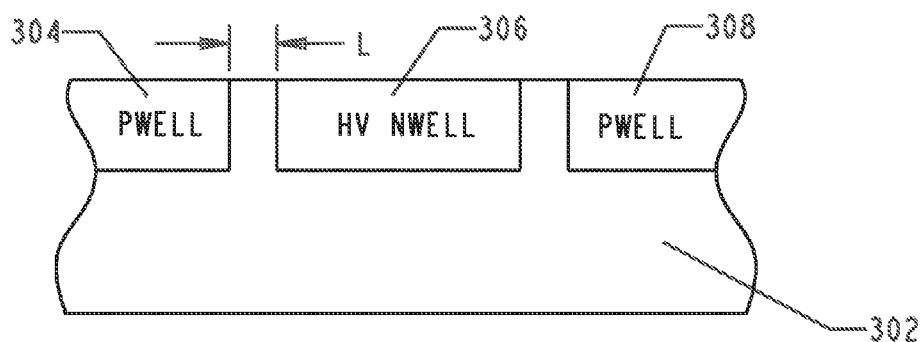
FIG. 3 comprises a cross sectional side view of a CMOS substrate showing a double well configuration according to various embodiments of the present invention.

Referring now to FIG. 3, one example of the CMOS structure for the transistors of the circuit of FIG. 2 is described. The substrate 302 is very lightly doped with acceptor atoms (P−). The substrate 302 includes a PWELL region 304, a HV NWELL region 306 and a PWELL region 308. The PWELL regions 304 and 308 are lightly doped with acceptor atoms and the HV NWELL region 306 is lightly doped with donor atoms. These regions form the bulks of the transistors. The PWELL regions form the bulk of the NMOS transistors and the NWELL regions form the bulks of the PMOS transistors. The NMOS transistors are placed inside the PWELL and the PMOS transistors are placed inside the NWELL. The circuit of FIG. 2 has only PMOS transistors. The transistors of the last stage (210 (M3), 222 (M8) and 224 (M9)) have their bulks connected together. They are placed inside one HV NWELL. The transistors of the next to last stage (208 (M2), 218 (M6) and 220 (M7)) are placed inside another HV NWELL. Only the last stage(s) of the charge pumps are subjected to high voltages so they need to be placed in HV (High Voltage) NWELL(s). The transistors of the first stage(s) can be placed inside NWELL(s) without substrate blocking doping around it (them).

In a double well CMOS process, the breakdown voltage between the NWELL and the substrate is limited by the breakdown voltage of the sidewall component of the NWELL to PWELL/substrate junction (without a separation distance L). The bottom component of the same junction has a higher breakdown voltage because the substrate has a lower doping level than the PWELL regions 304 and 308. By blocking the formation of the PWELL regions 304 and 308 around the NWELL region 306, it ensures that the NWELL region 306 is entirely surrounded by a low doped substrate, thereby increasing the breakdown voltage of the NWELL region 306 to substrate junction. Again, this blocking is accomplished using a blocked area that has a length L.

Depending on the length L of the blocked area, the breakdown voltage under question can be increased from 10 to about 20 volts in a standard 0.18 um CMOS process. The combination of appropriate circuit topology (limited by the maximum Vnwell-sub) and the described substrate doping blocking around the critical NWELL(s) 306 allows the implementation of a high output voltage charge pump in a standard low voltage CMOS process. In one example, L is approximately 1.8 microns and ranges between approximately 0.7 microns and 2 microns. Other examples of values for L are possible.

Figure 4:
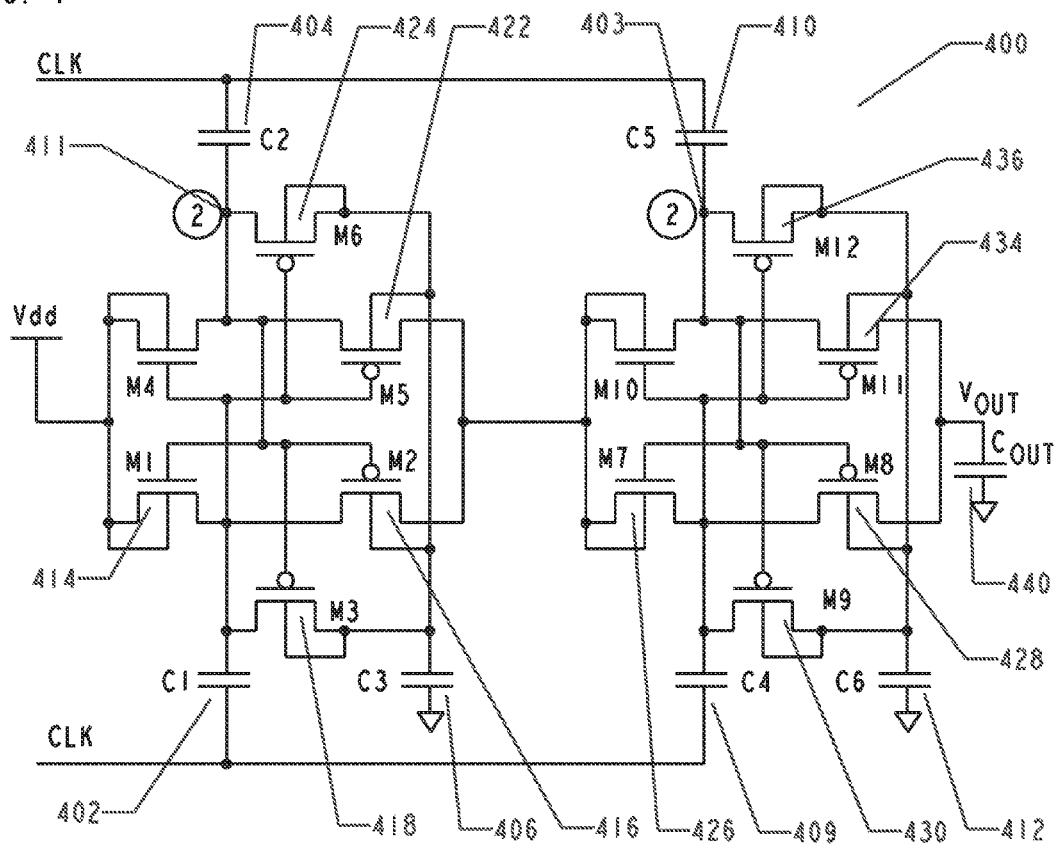
FIG. 4 comprises a circuit diagram of a voltage multiplier (or charge pump) according to various embodiments of the present invention.

Referring now to FIG. 4, another example of a voltage pump circuit 400 (e.g., the voltage pump 104 of FIG. 1) is described. The circuit 400 of FIG. 4 is a two-stage charge pump that is a voltage tripler. It can be extended to N stages where N is any integer. The voltage drop across each of the transistors in this circuit is never higher than Vdd. Each stage is realized with low voltage transistors (at least some of which are constructed according to the approaches described with respect to FIG. 5) and the switches are fully switched off/on by a simple two phase clock. The use of transistors with minimum dimensions provides minimum stray capacitances to ground in the signal path, minimizing the charge (i.e., signal) loss. All these features ensure high power and area efficiencies.

The charge pump 400 of FIG. 4 is implemented according to a standard triple well 0.18 um CMOS process. In one example and with the proposed substrate doping blocking around the NWELL it provides a measured output voltage of 11.5V consuming 720 nA at 1.27V supply voltage ($f_{CLK}$=512 kHz).

The circuit of FIG. 4 includes capacitors 402 (C1), 404 (C2), 406 (C3), 408 (C4), 410 (C5), 412 (C6), and 440 (Cout). The circuit also includes transistors 414 (M1), 416 (M2), 418 (M3), 420 (M4), 422 (M5), 424 (M6), 426 (M7), 428 (M8), 430 (M9), 432 (M10), 434 (M11), and 436 (M12). Initially, the capacitors are not charged. Therefore, the voltages across all of them are zero. Additionally, $V_{Clk}$=0 V; $V_{\overline{Clk}}$=Vdd.

Vdd is applied to the designated input node in FIG. 4. The transistor 414 (M1) is on and the capacitor 402 (C1) is being charged to a voltage $V_{C1}$=Vdd−$Vds_{M1}$, where $Vds_{M1}$ is the voltage drop across the transistor 414 (M1). Normally, Vdd≫$Vds_{M1}$ so that $V_{C1}$~Vdd. The transistors 416 (M2), 418 (M3), and 420 (M4) are off.

The clock signal changes its value $V_{Clk}$=Vdd; $V_{\overline{Clk}}$=0V. The voltage of node 401 is $V_1$=$V_{C2}$+$V_{Clk}$~2Vdd. The transistors 416 (M2), 418 (M3), 420 (M4) and 432 (M10) turn on. Transistor 414 (M1) turns off at the same time. Transistors 422 (M5), 424 (M6) and 426 (M7) are also off. The capacitor 410 (C5) is being charged to a voltage $V_{C5}$=$V_{C1}$+$V_{Clk}$−$Vds_{M2}$−$Vds_{M10}$ (through transistors 416 (M2) and 432 (M10)).

Normally $V_{C1}$+$V_{Clk}$≫$Vds_{M10}$, so that at steady state $V_{C5}$=$V_{C1}$+$V_{Clk}$~2Vdd. At the same time the capacitor 406 (C3) is being charged to a voltage $V_{C2}$=$V_{C1}$+$V_{Clk}$−$Vds_{M2}$. Again, normally $V_{C1}$+$V_{Clk}$≫$Vds_{M2}$, so that at steady state $V_{C2}$~$V_{C1}$+$V_{Clk}$~2Vdd. The capacitor 406 (C3) provides a proper bias for the NWELL/DeepNWELL of the transistors of the first stage.

While the capacitors 406 (C3) and 410 (C5) are being charged, capacitor 404 (C2) is also being charged to a voltage $V_{C2}$=Vdd−$Vds_{M4}$. Normally, Vdd≫$Vds_{M4}$ so that at steady state $V_{C2}$~Vdd.

The clock signal changes its value $V_{Clk}$=0V; $V_{\overline{Clk}}$=Vdd. The process described above repeats. At the same time the voltage of node 403 is $V_2$=$V_{C5}$+$V_{\overline{Clk}}$. The transistors 434 (M11) and 436 (M12) turn on. The transistors 428 (M8), 430 (M9), and 432 (M10) are off. The capacitor 440 (Cout) is being charged to a voltage $V_{Cout}$=$V_{C5}$+$V_{\overline{Clk}}$−$Vds_{M11}$. Again, normally $V_{C5}$+$V_{\overline{Clk}}$≫$Vds_{M11}$, so that at steady state $V_{Cout}$~$V_{C5}$+$V_{\overline{Clk}}$~3Vdd. The output voltage (Vout=$V_{Cout}$) is approximately 3 times the input one (Vdd). Thus, the described circuit is a voltage tripler. The biasing capacitor 412 (C6) is also being charged to a voltage $V_{C6}=V_{C5}+V_{\overline{Clk}}-Vds_{M12}$. Analogously, $V_{C5}+V_{\overline{Clk}} \gg Vds_{M12}$, so that at steady state $V_{C6} \sim V_{C5}+V_{\overline{Clk}} \sim 3Vdd$.

It will be appreciated that the voltage of node 411 at this moment is $V_2=V_{C2}+V_{\overline{Clk}} \sim 2Vdd$. The transistors 422 (M5), 424 (M6), 426 (M7) are on and the capacitor 408 (C4) is being charged to a voltage $V_{C4}=V_{C2}+V_{\overline{Clk}}-Vds_{M5}-Vds_{M7}$. Usually, $V_{C2}+V_{\overline{Clk}} \gg Vds_{M5}+Vds_{M7}$, so that at steady state $V_{C4}=V_{C2}+V_{\overline{Clk}} \sim 2Vdd$.

The capacitor 406 (C3) is being charged to a voltage $V_{C2}=V_{C2}+V_{\overline{Clk}}-Vds_{M6}$. Again $V_{C2}+V_{\overline{Clk}} \gg Vds_{M6}$, so that at steady state $V_{C2}=V_{C2}+V_{\overline{Clk}} \sim 2Vdd$.

The operation described above is cyclic. The output capacitor Cout is charged to approximately 3Vdd every half clock period through transistors 428 (M8) and 434 (M11) correspondingly. The described voltage multiplier operates in a push pull fashion.

Figure 5:
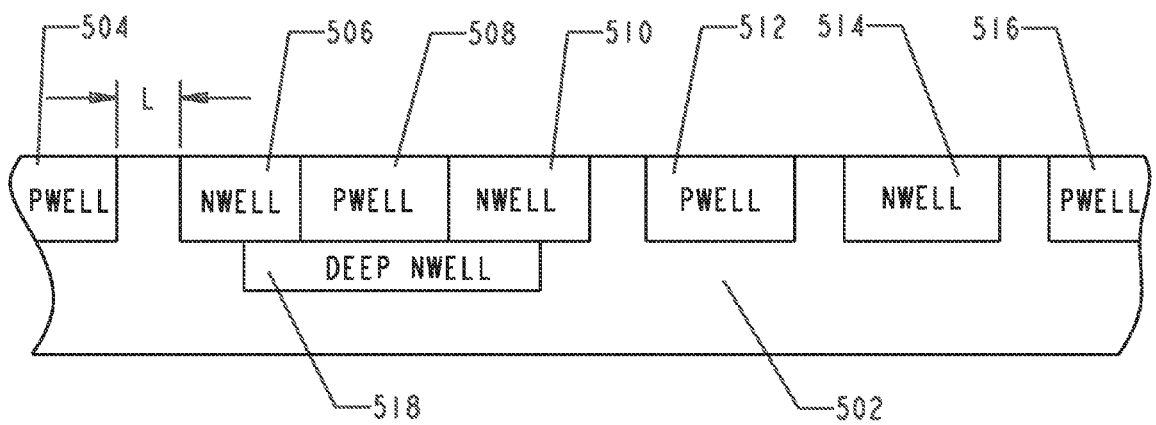
FIG. 5 comprises a cross sectional side view of a CMOS substrate showing a triple well configuration according to various embodiments of the present invention.

Referring now to FIG. 5, one example of the CMOS structure for the transistors of the circuit of FIG. 4 is described. A substrate 502 includes PWELL regions 504, 508, 512, and 516 and NWELL regions 506, 510, and 514 and a deep NWELL region 518. The transistors are constructed using a triple-well process with substrate doping blocking around the NWELL regions and around the Deep NWELL region 518. The doping blocking works in the same way as has been described elsewhere herein.

The substrate 502 is very lightly doped with acceptor atoms (P–). The PWELL regions 504, 508, 512, and 516 are lightly doped with acceptor atoms and the NWELL regions 506, 510, 514 are lightly doped with donor atoms, and the Deep NWELL region is lightly doped with donor atoms. These regions form the bulks of the transistors. The PWELL regions (504, 512 and 516) form the bulk of the NMOS transistors. The PWELL region (508) above the Deep NWELL region (518) forms the bulk of the isolated NMOS transistor(s). The NWELL regions form the bulks of the PMOS transistors. Again, there is no full MOS transistor shown in FIG. 5.

In the triple well process of FIG. 5 used to construct the MOS transistors, the breakdown voltage between the NWELL and the substrate and also between the substrate and the Deep NWELL region is limited by the breakdown voltage of the sidewall component of the NWELL to PWELL/substrate junction (without a separation distance L). By adding the separation distance L, the breakdown voltage is increased thereby increasing the maximum output voltage. In one example, L is approximately 1.8 microns and can range between 0.7 microns and 2 microns. Other examples of dimensions are possible.

In one particular example, the charge pump from FIG. 4 is constructed according to a triple well 0.18 um CMOS process. In one example and with substrate doping blocking around the NWELL a measured output voltage of 11.5 V consuming 720 nA at 1.27 V supply voltage ($f_{CLK}$=512 kHz) is provided. L is selected to be 1.8 microns. Other examples of values and dimensions are possible.

It will be appreciated that a method of manufacturing the above devices is also provided and this process can use commonly available CMOS design kits. When the devices are constructed, the elements of the circuits of FIG. 2, FIG. 4, FIG. 6, and FIG. 8 are constructed (in one example, on a single chip) and at least some of the transistors are constructed according to the approaches described with respect to FIG. 3 or FIG. 5.

The isolated NMOS transistors 432 (M10) and 426 (M7) (e.g., see FIG. 4) are placed inside the PWELL (508). The PMOS transistors 430 (M9), 436 (M12), 434 (M11) and 428 (M8) are placed inside the NWELLs (506 and 510) above the Deep NWELL (518). The NWELL/Deep NWELL is connected to the capacitor 412 (C6). The NWELL/Deep NWELL is with substrate doping blocking around it. Analogously, the transistors of the next to last stage are placed in another PWELL/NWELL/Deep NWELL structure (508/506,510/518) with substrate doping blocking around it. Only the last stages of the charge pump are subjected to high voltages and therefore need the substrate blocking. For the first stages, substrate blocking is not needed.

Figure 6:
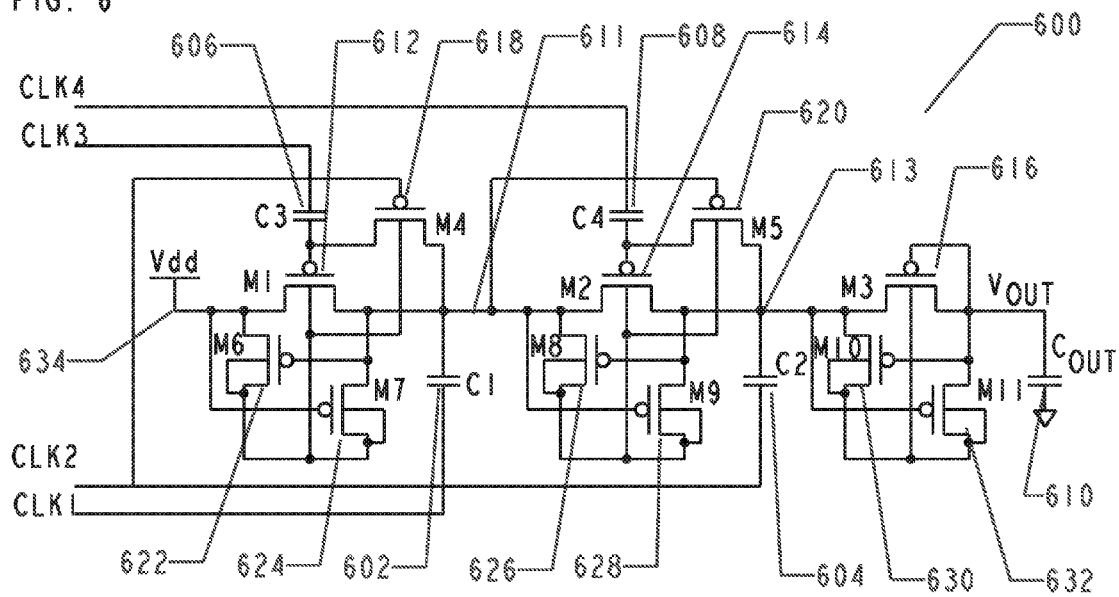
FIG. 6 comprises a circuit diagram of a two stage gate boosted charge pump according to various embodiment.
Figure 7:
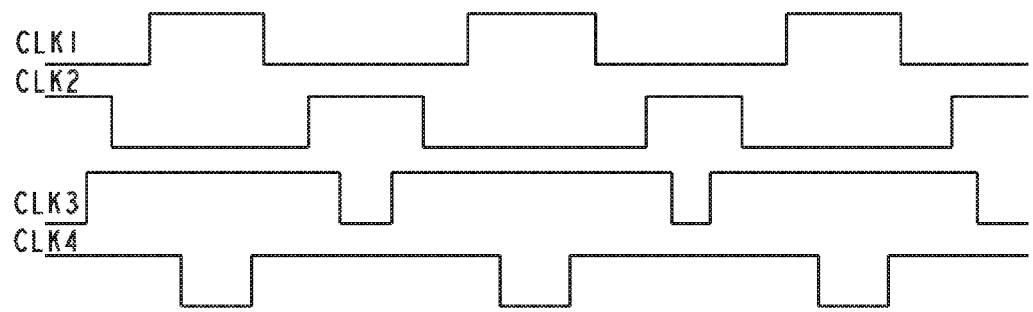
FIG. 7 comprises a timing diagram of the clock signals applied to the circuit of FIG. 6 according to various embodiments of the present invention.

Referring now to FIGS. 6 and 7, another example of a charge pump circuit 600 is described. The operation of this two stage gate boosted charge pump is implemented with only PMOS transistors. The circuit shown is a voltage tripler. However, the approaches described with respect to these figures can be extended to the general case of N stage charge pump.

The double well CMOS process of FIG. 3 may be used to construct the circuit 600. The PMOS transistors of the last stage 616 (M3), 630 (M10), and 632 (M11) have their bulks connected together and are placed is a HV NWELL (306). Analogously, the PMOS transistors of the next to last stage 614 (M2), 620 (M5), 626 (M8) and 628 (M9) are placed together in another (separate) NV NWELL. The first stages may be placed in NWELLs without substrate blocking doping around them.

The circuit 600 includes capacitors 602 (C1), 604 (C2), 606 (C3), 608 (C4) and 610 (COUT). The circuit 600 also includes transistors 612 (M1), 614 (M2), 616 (M3), 618 (M4), 620 (M5), 622 (M6), 624 (M7), 626 (M8), 628 (M9), 630 (M10), and 632 (M11). The transistors M1-M11 are PMOS transistors. The signals CLK1-4 as applied to the circuit 600 are shown in FIG. 7.

Initially, the capacitors 602-608 (C1-4) and 610 (Cout) are not charged. Therefore, the voltages across all of them are zero. $V_{Clk1}$=0 V; $V_{Clk2}$=Vdd; $V_{Clk2}$=0 V; $V_{Clk4}$=Vdd. Vdd is applied to the designated input node 634 in FIG. 6. The transistor 612 (M1) is on and the capacitor 602 (C1) is being charged to a voltage $V_{C1}$=Vdd−$Vds_{M1}$, where $Vds_{M1}$ is the voltage drop across the transistor 612 (M1). Normally, Vdd $\gg Vds_{M1}$ so that $V_{C1}$~Vdd. The transistors 614 (M2) and 616 (M4) are off. $V_{Clk2}$ changes its value, $V_{Clk2}$=Vdd. The transistor 612 (M1) turns off Cclk2 changes its value, Vclk2=0 V. The transistor 618 (M4) turns on. Vclk1 changes its value, Vclk1=Vdd. The voltage of node 611 is $V_1=V_{C1}+V_{Clk}$~2Vdd. The capacitor 606 (C3) is charged to Vdd. $V_{Clk4}$ changes its value, $V_{Clk4}$=0 V. The transistor 614 (M2) turns on. The capacitor 604 (C2) is being charged to $V_{C2}=V_1-Vds_{M2}$~2Vdd. Normally $V_1 \gg Vds_{M2}$. $V_{Clk4}$ changes its value, $V_{Clk4}$=Vdd. The transistor 614 (M2) turns off (at steady state operation). $V_{Clk1}$ changes its value $V_{Clk1}$=0 V. The transistor 620 (M5) turns on. The capacitor 608 (C4) is charged to Vdd. The capacitor 606 (C3) is discharged to zero.

Vclk2 changes its value, Vclk2=Vdd. The transistor 618 (M4) turns off. The voltage of node 613 is $V=V_2=V_{C2}+V_{Clk2}$~3Vdd. The output capacitor 610 (Cout) is charged to $V_{Cout}=V_{C2}+V_{Clk2}-Vds_{M3}$ via the diode connected transistor 616 (M3). Again, normally $V_{C2}+V_{Clk2} \gg Vds_{M2}$, so that steady state $V_{Cout} \sim V_{C2}+V_{Clk2}$~3Vdd. The output voltage (Vout=$V_{Cout}$) is approximately 3 times the input one (Vdd). Thus, the circuit 600 is a voltage tripler. The capacitor 608 (C4) is charged to 2Vdd at the same time. $V_{Clk2}$ changes its value, $V_{Clk2}$=0 V. The transistor 612 (M1) turns on. The process described above repeats.

The transistor pairs 622-624 ($M_6$-$M_7$), 626-628 ($M_8$-$M_9$) and 630-632 ($M_{10}$-$M_{11}$) function as comparators/switches. They ensure that the bulk of each charge transfer transistor, 612 (M1), 614 (M2), and 616 (M3) correspondingly, is either switched to its source or drain, depending on which of them has a higher potential. This eliminates the bulk effect of 612 (M1), 614 (M2), and 616 (M3). As a result, the Vds of each stage is minimized and does not depend on the stage number. Hence, the output voltage Vout is a linear function of the number of stages N. The described bulk switching also provides proper biasing for the p-n junctions of the transistors 618 (M4) and 620 (M5).

Figure 8:
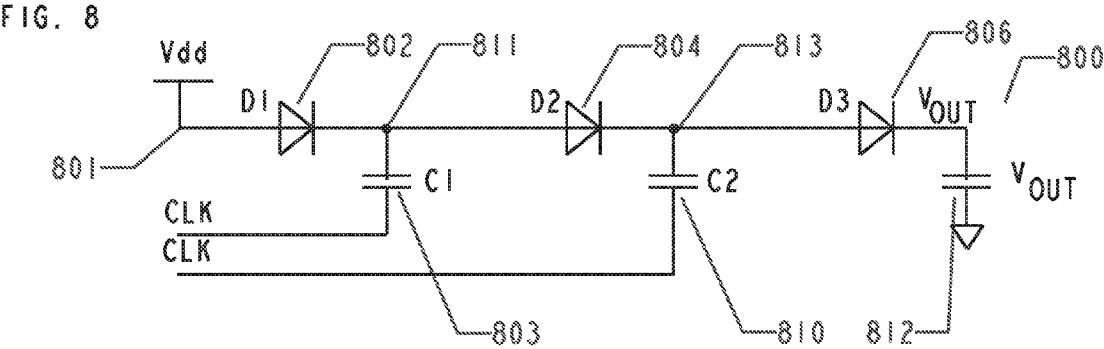
FIG. 8 comprises a circuit diagram of another example of a charge pump according to various embodiments of the present invention.

Referring now to FIG. 8, another example of a charge pump circuit 800 is described. The circuit 800 includes a diode 802 (D1), a diode 804 (D2), a diode 806 (D3), a capacitor 808 (C1), a capacitor 810 (C2), and a capacitor 812 (Cout). The circuit of FIG. 8 is a voltage tripler. The approaches described in FIG. 8 can be extended to the general case of N stage charge pump. Floating p-n junction diodes are available in a triple well CMOS process as known to those skilled in the art. In one example, the diode is placed inside the PWELL (508) in FIG. 5. Only part of the diode is shown in FIG. 5 (the "p" part).

Initially, the capacitors 808 (C1), 810 (C2) and 812 (Cout) are not charged. Therefore, the voltages across all of them are zero. $V_{Clk}=0$ V; $V_{\overline{Clk}}=Vdd$ Vdd is applied to the designated input node 801. The diode 802 (D1) is on and the capacitor 808 (C1) is being charged to a voltage $V_{C1}=Vdd-Vd_1$, where $Vd_1$ is the voltage drop across the diode 802(D1). Normally, $Vdd \gg Vd_1$ so that $V_{C1} \sim Vdd$. The diode 804 (D2) is off. The clock signal changes its value $V_{Clk}=Vdd$; $V_{\overline{Clk}}=0$ V. The voltage of node 811 is $V_1=V_{C1}+V_{Clk} \sim 2Vdd$. The diode 804 (D2) turns on. The diode 802 (D1) turns off at the same time. The capacitor 810 (C2) is being charged to a voltage $V_{C2}=V_{C1}+V_{Clk}-Vd_2$. Again, normally $V_{C1}+V_{Clk} \gg Vd_2$, so that at steady state $V_{C2} \sim V_{C1}+V_{Clk} \sim 2Vdd$.

The clock signal changes its value $V_{Clk}=0V$; $V_{\overline{Clk}}=Vdd$. The process described above repeats. At the same time the voltage of node 813 is $V_2=V_{C2}+V_{\overline{Clk}}$. The diode 806 (D3) turns on. The capacitor 812 (Cout) is being charged to a voltage $V_{Cout}=V_{C2}+V_{\overline{Clk}}-Vd_2$. Again, normally $V_{C2}+V_{\overline{Clk}} \gg Vd_2$, so that at steady state $V_{Cout} \sim V_{C2}+V_{\overline{Clk}} \sim 3Vdd$. The output voltage (Vout=$V_{Cout}$) is approximately 3 times the input one (Vdd). Thus, the circuit 800 described is a voltage tripler. The operation described above is cyclic and repeats.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A microphone circuit comprising:
   a condenser microphone, the condenser microphone configured to receive sound energy and responsively convert the sound energy into a microphone output voltage;
   a charge pump, the charge pump coupled to the microphone and configured to supply a bias voltage to the microphone allowing the microphone to operate, the charge pump comprising:
      a circuit topology including an NWELL region and a substrate, the circuit topology having a maximum output voltage limited by a breakdown voltage between the NWELL region and the substrate, the topology being implemented in a low voltage CMOS process;
      wherein the breakdown voltage between the NWELL region and the substrate is increased by blocking the formation of a PWELL region around the NWELL region at a predetermined distance so that the NWELL region is surrounded by the substrate from substantially all sides thereby increasing the maximum output voltage of the charge pump;
   a deep NWELL region disposed in the substrate.

2. The microphone circuit of claim 1 further comprising an amplifier coupled to the condenser microphone.

3. The microphone circuit of claim 1 wherein the deep NWELL region is disposed adjacent to the NWELL region.

4. The microphone circuit of claim 1 wherein the substrate completely surrounds the NWELL region.

5. A charge pump that is configured to supply a sufficient output/bias voltage to a condenser microphone allowing the microphone to operate with sufficient sensitivity, the charge pump comprising:
   a circuit topology including an NWELL region and a substrate, the circuit topology having a maximum output voltage limited by a breakdown voltage between the NWELL region and the substrate, the topology being implemented in a low voltage CMOS process;
   wherein the breakdown voltage between the NWELL region and the substrate is increased by blocking the formation of a PWELL region around the NWELL region at a predetermined distance so that the NWELL region is surrounded by the substrate from substantially all sides thereby increasing the maximum output voltage of the charge pump;
   a deep NWELL region disposed in the substrate.

6. The charge pump of claim 5 further comprising an amplifier coupled to the condenser microphone.

7. The charge pump of claim 5 wherein the deep NWELL region is disposed adjacent to the NWELL region.

8. The charge pump of claim 5 wherein the substrate completely surrounds the NWELL region.

* * * * *